US012288921B2

(12) United States Patent
Tsorng et al.

(10) Patent No.: US 12,288,921 B2
(45) Date of Patent: Apr. 29, 2025

(54) SMART POLE ASSEMBLY

(71) Applicant: Quanta Computer Inc., Taoyuan (TW)

(72) Inventors: Yaw-Tzorng Tsorng, Taoyuan (TW); Ming-Lung Wang, Taoyuan (TW); Kai-Hsiang Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 377 days.

(21) Appl. No.: 17/889,577

(22) Filed: Aug. 17, 2022

(65) Prior Publication Data

US 2024/0063524 A1 Feb. 22, 2024

(51) Int. Cl.
*E04H 12/18* (2006.01)
*H01Q 1/12* (2006.01)

(52) U.S. Cl.
CPC ......... *H01Q 1/1235* (2013.01); *E04H 12/182* (2013.01); *H01Q 1/1242* (2013.01)

(58) Field of Classification Search
CPC .......... H01Q 1/1235; H01Q 1/08; H01Q 1/10; H01Q 1/103; E04H 12/18; E04H 12/182; E04H 12/185
USPC .................................... 343/880, 833; 52/118
See application file for complete search history.

(56) References Cited

U.S. PATENT DOCUMENTS 2,949,692 A * 8/1960 Kuhn .................... A63H 33/06 446/124
3,754,267 A * 8/1973 Walters .................... H01Q 9/12 343/705
4,358,915 A * 11/1982 Pantalone ............. E04H 12/182 52/118
4,513,938 A * 4/1985 Seymour ................. B65F 1/141 403/109.5
7,243,473 B2 * 7/2007 Terrels ....................... E04C 3/32 52/843
2007/0028532 A1 * 2/2007 Douglas ................ E04H 12/182 52/118
2010/0225036 A1 * 9/2010 Zhang ................. B05B 13/0285 269/58
2010/0314503 A1 * 12/2010 Ford ..................... E04H 12/182 248/70

(Continued)

FOREIGN PATENT DOCUMENTS

CN 110965840 B * 8/2021 ........... E04H 12/182
DE 102006003210 A1 * 7/2007 ........... E04B 1/0046

*Primary Examiner* — Kyle J. Walraed-Sullivan
(74) *Attorney, Agent, or Firm* — NIXON PEABODY LLP

(57) ABSTRACT

A smart pole assembly for a telecommunication network and a method for opening a cover assembly of the smart pole assembly are disclosed. The smart pole assembly includes a base frame having a hollow interior space for receiving at least one telecommunication device; a pole fixed to the base frame and having a pole top to facilitate transmitting or receiving of communications between the telecommunication device and another telecommunication device; and a cover assembly coupled to and enclosing the base frame. The cover assembly includes a telescoping mechanism to move the cover assembly between a closed state and an open state. The cover assembly fully encloses the hollow interior space in the closed state for protecting the at least one telecommunication device. The cover assembly exposes and provides access to at least a portion of the hollow interior space in the open state.

20 Claims, 6 Drawing Sheets

(56) References Cited

U.S. PATENT DOCUMENTS

| | | | | |
|---|---|---|---|---|
| 2016/0131279 | A1* | 5/2016 | Kemp | F16L 3/16<br>248/55 |
| 2017/0130753 | A1* | 5/2017 | Kemp | F16B 7/105 |
| 2018/0219278 | A1* | 8/2018 | Wigdahl | H01Q 1/1242 |
| 2019/0078331 | A1* | 3/2019 | Karstens | E04H 12/34 |
| 2019/0368216 | A1* | 12/2019 | Young | F16B 7/105 |
| 2021/0108435 | A1* | 4/2021 | Jolani | E04H 12/182 |
| 2021/0396034 | A1* | 12/2021 | Turnquist | B28B 1/001 |
| 2022/0087427 | A1* | 3/2022 | Sun | A47C 3/20 |
| 2022/0194760 | A1* | 6/2022 | Kim | E04H 12/182 |
| 2022/0348444 | A1* | 11/2022 | Hu | E04H 12/182 |
| 2022/0407235 | A1* | 12/2022 | Gaudette | H01Q 1/288 |
| 2023/0151631 | A1* | 5/2023 | Sellers | E04H 12/2292<br>52/834 |
| 2023/0238788 | A1* | 7/2023 | Saline | F21V 21/30<br>174/50 |

* cited by examiner

SMART POLE ASSEMBLY

FIELD OF THE INVENTION

The present invention relates generally to a smart pole assembly, and more specifically, to a cabinet of a smart pole assembly and an opening mechanism for the same.

BACKGROUND OF THE INVENTION

Smart poles serve various functions by hosting a vast array of technologies such as cellular networks, internet of things (IoT), smart devices, and vehicle applications. As more technologies are incorporated into smart poles, the amount of devices and cables in cabinets of smart pole assemblies will also increase. In general, a single door/opening is provided to a portion of conventional cabinets of smart poles, and it is difficult to install and manage devices in the cabinet by accessing via the single door/opening. Oftentimes, the door may be swung open such that the open door is hanged externally or the door is completely detached from the conventional smart poles. Such design of the conventional smart pole assemblies may pose danger to the environments such as sidewalks or roads, imposing potential injuries to people around the smart poles.

Further, since most smart poles are located in outdoor environments, cabinets of smart pole assemblies and their access doors should be built to withstand harsh conditions. Therefore, a need exists for improved smart pole assemblies that allow easy access to devices stored therein while being weather-proof. The present disclosure is directed to such a smart pole assembly that provides easy access to stored devices, at the same time, ensuring a weather-proof design.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a smart pole assembly for a telecommunication network is disclosed. According to various embodiments, the smart pole assembly includes a base frame having a hollow interior space for receiving at least one telecommunication device; a pole fixed to the base frame and having a pole top configured to facilitate transmitting or receiving of communications between the telecommunication device and another telecommunication device; and a cover assembly coupled to and enclosing the base frame. The cover assembly includes a telescoping mechanism that is configured to move the cover assembly between a closed state and an open state. The cover assembly fully encloses the hollow interior space in the closed state for protecting the at least one telecommunication device. The cover assembly exposes and provides access to at least a portion of the hollow interior space in the open state.

In some examples, the cover assembly includes a plurality of cover segments, each of a subset of the cover segments being of progressively smaller perimeters nested within each other. For example, the plurality of cover segments includes at least a first cover segment and a second cover segment, the second cover segment being slidably coupled to the first cover segment. A perimeter of the second cover segment is smaller than a perimeter of the first cover segment.

In some examples, the plurality of cover segments further includes a third cover segment that is slidably coupled to the second cover segment, a perimeter of the third cover segment being smaller than the perimeter of the second cover segment. In some examples, each cover segment has a cylindrical shape.

In some examples, each cover segment has a wall, an upper flange coupled to or extending from a top of the wall, and a lower flange coupled to or extending from a bottom of the wall. Further, in some examples, the upper flange has an externally protruded upper ridge and an internally protruded upper ridge. Furthermore, in some examples, the lower flange has an internally protruded lower ridge.

In some examples, the first cover segment has a first cover segment upper flange and a first cover segment lower flange, the first cover segment upper flange including a first cover segment externally protruded upper ridge and a first cover segment internally protruded upper ridge, and the first cover segment lower flange including a first cover segment internally protruded lower ridge. Further, in some examples, the second cover segment has a second cover segment upper flange and a second cover segment lower flange, the second cover segment upper flange including a second cover segment externally protruded upper ridge and a second cover segment internally protruded upper ridge, and the second cover segment lower flange including a second cover segment internally protruded lower ridge. Furthermore, in some examples, the second cover segment externally protruded upper ridge is movable between the first cover segment internally protruded upper ridge and the first cover segment internally protruded lower ridge.

In some examples, the cover assembly further includes a waterproof element located on a surface of the first cover segment internally protruded lower ridge or on a surface of the second cover segment externally protruded upper ridge, the waterproof element being positioned in between the first cover segment internally protruded lower ridge of the first cover segment and the second cover segment externally protruded upper ridge of the second cover segment. For example, the waterproof element includes an O-ring, a gasket, or a glue material.

In some examples, the open state includes a first open state and a second open state. In some examples, the cover assembly exposes only a portion of the hollow interior space in the first open state, and the cover assembly exposes all of the hollow interior space in the second open state.

In some examples, the smart pole assembly further includes a top fastener configured to secure the cover assembly to the base frame. Further, in some examples, the cover assembly includes a plurality of cover segments, and the top fastener penetrates a portion of a cover segment having a largest perimeter to secure the cover assembly to the base frame.

In some examples, the smart pole assembly further includes a bottom fastener configured to secure the cover assembly to the base frame. The bottom fastener penetrates a portion of a cover segment having a smallest perimeter to secure the cover assembly to the base frame.

In some examples, the smart pole assembly further includes a side fastener configured to secure the cover assembly in the open state. The side fastener prevents the cover assembly from being closed when engaged with the cover assembly.

According to certain aspects of the present disclosure, a smart pole cabinet is disclosed. The smart pole cabinet includes a frame and a cover assembly coupled to and enclosing the frame. According to various embodiments, the cover assembly includes at least a first cover segment having a largest diameter and a second cover segment having a smallest diameter. The cover assembly is in a fully extended configuration when the cover assembly is in a closed state. The cover assembly is in a collapsed configuration when the cover assembly is in an open state. The first cover segment is at a top position and the second cover segment is at a bottom position when the cover assembly is in the closed state. The first cover segment is at an outermost position and the second cover segment is at an innermost position when the cover assembly is in the open state.

In some examples, the smart pole cabinet further includes a plurality of waterproof elements. Each waterproof element is positioned between two adjacent cover segments among a plurality of cover segments. Further, each waterproof element is in contact with the two adjacent cover segments when the cover assembly is in the closed state. Furthermore, the waterproof element includes an O-ring, a gasket, or a glue material.

In some examples, the open state includes a first open state and a second open state. The cover assembly surrounds a first portion of an interior space of the frame in the first open state. The cover assembly surrounds a second portion of the interior space in the second open state.

According to certain aspects of the present disclosure, a method for opening a cover assembly of a smart pole assembly is disclosed. According to various embodiments, the cover assembly includes a plurality of cover segments. According to various embodiments, the method includes releasing a top fastener from a first cover segment among the plurality of cover segments progressively coupled with each other by a telescoping mechanism, causing the cover assembly to collapse in a first direction to be in a second open state. The method further includes releasing a bottom fastener from a second cover segment among the plurality of cover segments, causing the cover assembly to collapse in a second direction opposite the first direction to be in a first open state.

In some examples, a first perimeter of the first cover segment is largest among perimeters of the plurality of cover segments. Further, in some examples, a second perimeter of the second cover segment is smallest among the perimeters of the plurality of cover segments.

In some examples, the method further includes causing a side fastener to contact a bottom surface of the second cover segment. When the side fastener is engaged with the second cover segment after the cover assembly is placed in the first open state, the cover assembly is maintained in the first open state.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1B:
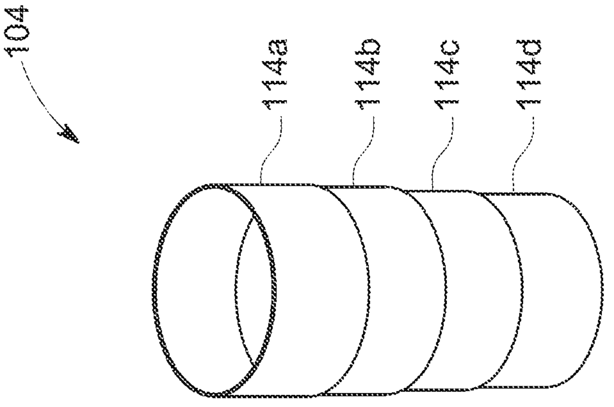
FIG. 1B shows a cover assembly of the smart pole assembly shown in FIG. 1A, according to certain aspects of the present disclosure.

While the present disclosure is susceptible to various modifications and alternative forms, specific implementations have been shown by way of example in the drawings and will be described in further detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present disclosure relates to a smart pole assembly with a cover assembly including a telescoping mechanism. The cover assembly including a plurality of cover segments allows easy access to a desired interior space within the smart pole assembly without affecting the environment around the smart pole assembly.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 1A:
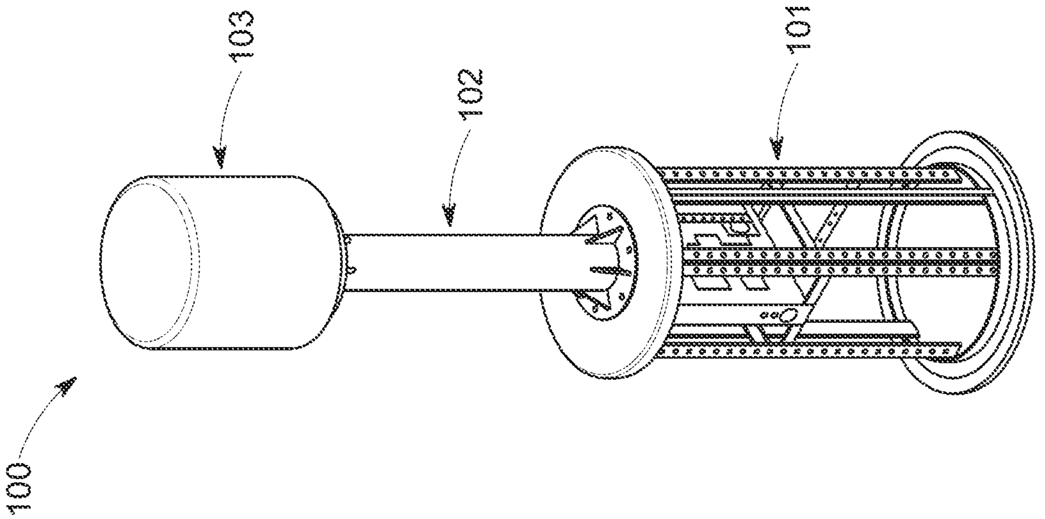
FIG. 1A shows a smart pole assembly without a cover assembly, according to certain aspects of the present disclosure.
Figure 2C:
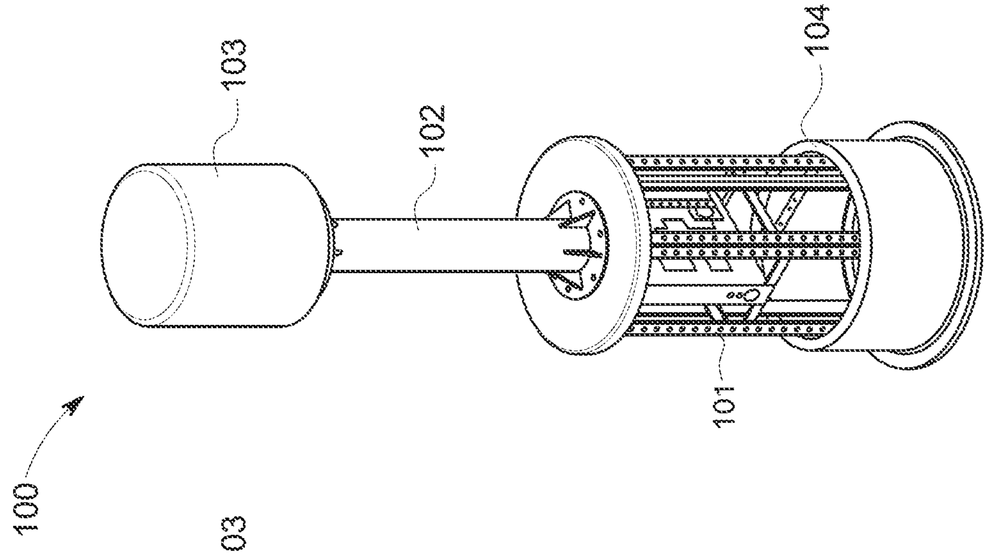
FIG. 2C shows the smart pole assembly shown in FIG. 2A with its cover assembly in a second open state, according to certain aspects of the present disclosure.
Figure 2B:
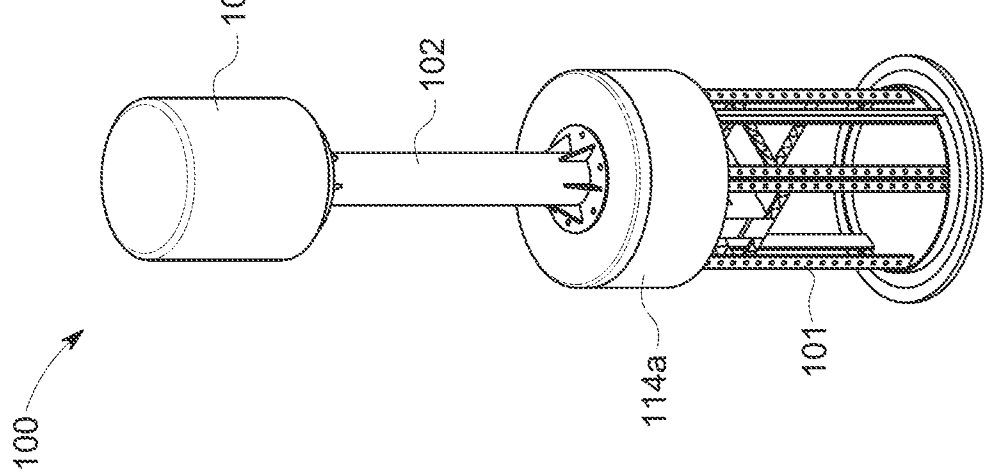
FIG. 2B shows the smart pole assembly shown in FIG. 2A with its cover assembly in a first open state, according to certain aspects of the present disclosure.
Figure 2A:
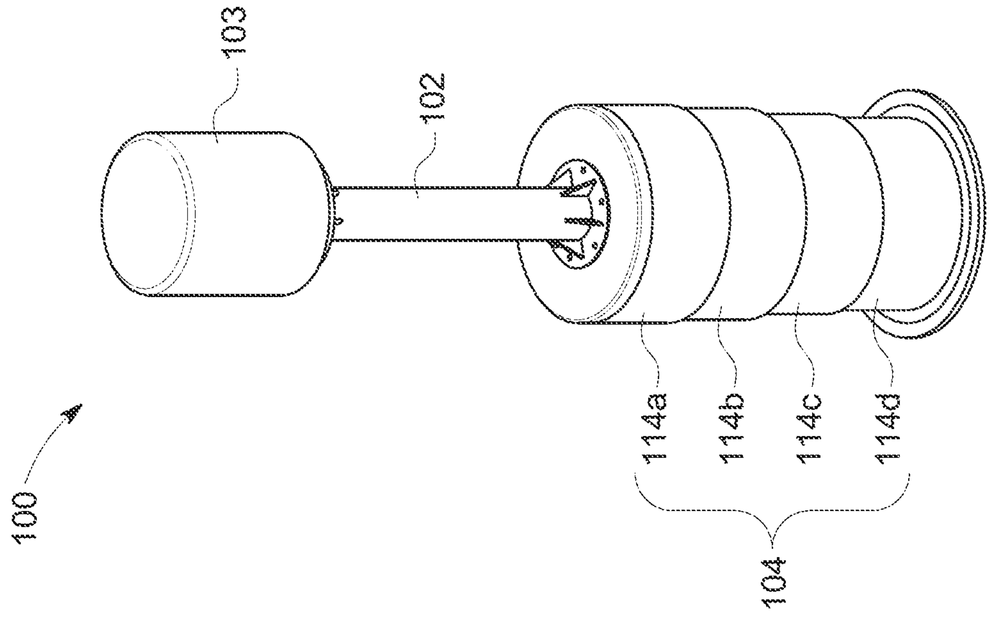
FIG. 2A shows a smart pole assembly with its cover assembly in a closed state, according to certain aspects of the present disclosure.

Referring to FIG. 1A, a smart pole assembly 100 for a telecommunication network includes a base frame 101 having a hollow interior space for receiving at least one telecommunication device, a pole 102 fixed to the base frame 101 and having a pole top 103 configured to facilitate transmitting or receiving of communications between the telecommunication device and another telecommunication device. Referring to FIGS. 1B and 2A, the smart pole assembly 100 further includes a cover assembly 104 coupled to and enclosing the base frame 101. The cover assembly 104 includes a telescoping mechanism that is configured to move the cover assembly between a closed state (shown in FIG. 2A) and an open state (shown in FIGS. 2B and 2C). As shown in FIG. 2A, the cover assembly 104 fully encloses the hollow interior space in the closed state for protecting the at least one telecommunication device. As exemplified in FIGS. 2B and 2C, the cover assembly 104 exposes and provides access to at least a portion of the hollow interior space in the open state.

To achieve the telescoping mechanism, the cover assembly 104 includes a plurality of cover segments 114*a*, 114*b*, 114*c*, 114*d*, each of a subset of the cover segments being of progressively smaller perimeters nested within each other, as shown in FIG. 1B. For example, the cover assembly 104 can be in a fully extended configuration, as shown in FIG. 2A, or can be in a collapsed configuration, as exemplified in FIGS. 2B and 2C.

Figure 3A:
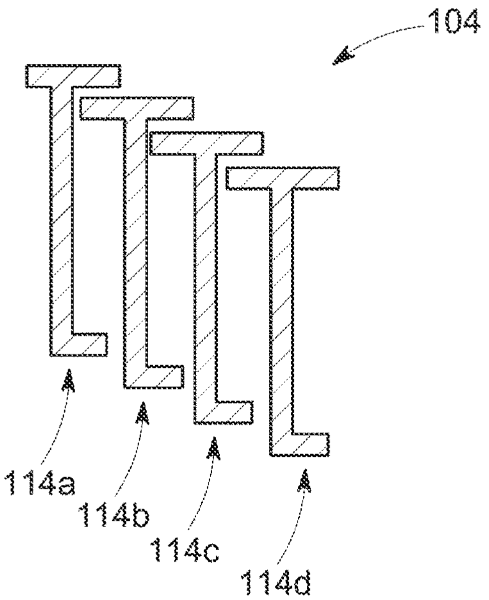
FIG. 3A is a schematic diagram of a cover assembly of a smart pole assembly in a collapsed configuration, according to certain aspects of the present disclosure.

For example, as shown in FIGS. 1B, 2A, 3A, and 3B, the plurality of cover segments includes a first cover segment 114*a*, a second cover segment 114*b*, a third cover segment 114*c*, and a fourth cover segment 114*d* that are slidably coupled to each other. When the cover assembly 104 is in the collapsed configuration, as shown in FIGS. 2B, 2C, and 3A, all or most of the second cover segment 114*b*, third cover segment 114*c*, and fourth cover segment 114*d* are enclosed within the first cover segment 114*a*, the second cover segment 114*b* enclosing the third and fourth cover segments 114*c*, 114*d*, and the third cover segment 114*c* enclosing the fourth cover segment 114*d*. That is, the diameters decrease in the order of the first cover segment 114*a*, second cover segment 114*b*, third cover segment 114*c*, and fourth cover segment 114*d* such that all or most of the second cover segment 114*b*, third cover segment 114*c*, and fourth cover segment 114*d* are not visible externally while the first cover segment 114*a* is fully visible externally when the cover assembly 104 is in the collapsed state. See FIGS. 2B and 2C.

According to some embodiments, the first cover segment 114*a* is at a top position and the fourth cover segment 114*d* is at a bottom position when the cover assembly 104 is in the closed state, as shown in FIG. 2A. Further, the first cover segment 114*a* is at an outermost position and the fourth cover segment 114*d* is at an innermost position when the cover assembly 104 is in the open state, as shown in FIGS. 2B and 2C.

According to some embodiments, the cover assembly 104 does not need to be completely removed or detached from the base frame 101 to expose the interior space of the base frame. That is, the cover assembly 104 can be opened by sliding the plurality of cover segments 114*a*, 114*b*, 114*c*, 114*d* upward or downward to expose the interior space of the base frame 101. Thus, the cover assembly 104 remains coupled to the base frame 101 even when the cover assembly is in an open state.

Although the number of cover segments exemplified in various drawings is four, the number is not limited to 4. The number of cover segments may be 2, 3, 4, or 5. Furthermore, the number of the cover segments may be more than 5 in some embodiments.

Figure 3B:
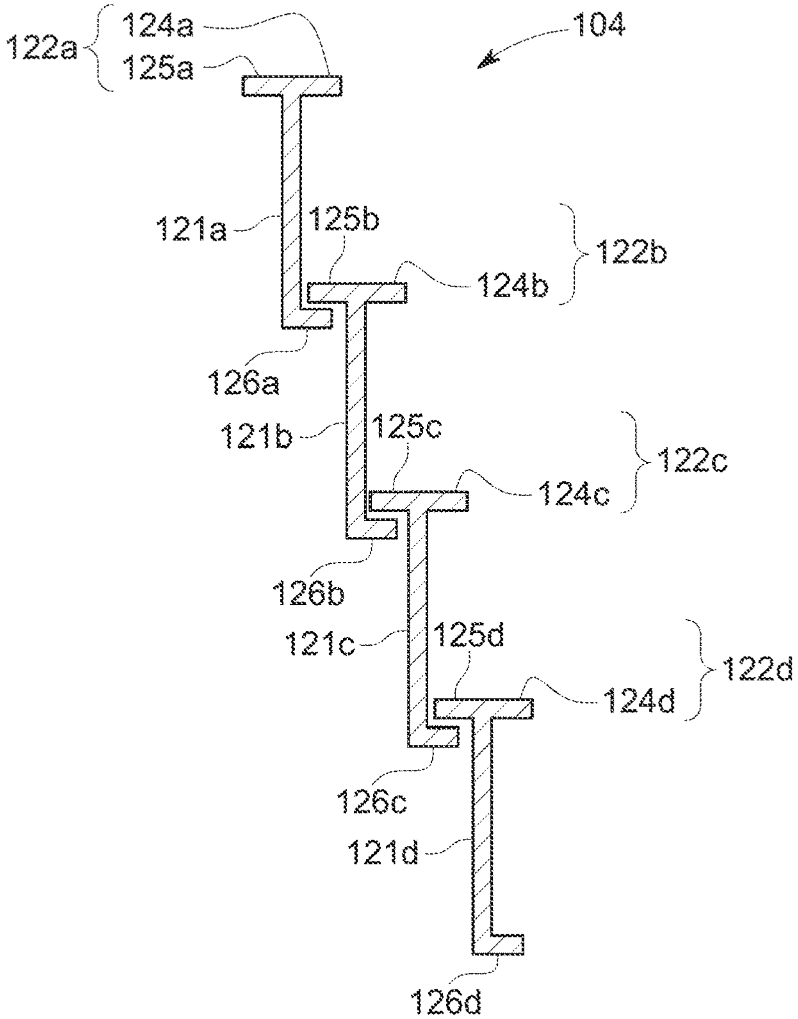
FIG. 3B is a schematic diagram of the cover assembly shown in FIG. 3A in a fully extended configuration, according to certain aspects of the present disclosure.
Figure 4A:
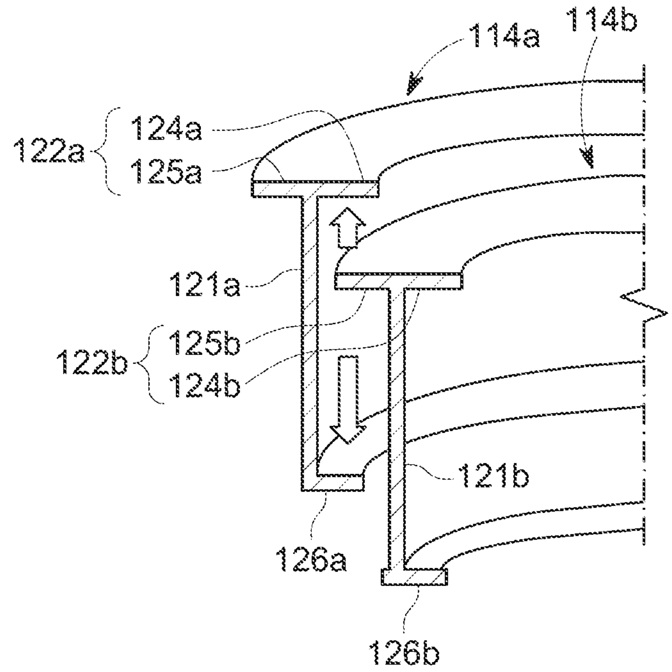
FIG. 4A is a schematic diagram of two cover segments of a cover assembly of a smart pole assembly, according to certain aspects of the present disclosure.

Referring to FIG. 4A, the second cover segment 114*b* is slidably coupled to the first cover segment 114*a*. A perimeter or diameter of the second cover segment 114*b* is smaller than a perimeter or diameter of the first cover segment 114*a*. Referring to FIGS. 3A, 3B, and 5A-5C, the third cover segment 114*c* is slidably coupled to the second cover segment 114*b*, and the fourth cover segment 114*d* is slidably coupled to the third cover segment 114*c*. A perimeter or diameter of the third cover segment 114*c* is smaller than the perimeter or diameter of the second cover segment 114*b*, and a perimeter or diameter of the fourth cover segment 114*d* is smaller than the perimeter or diameter of the third cover segment 114*c*. In some examples, each cover segment 114*a*/114*b*/114*c*/114*d* has a cylindrical shape, as exemplified in drawings. However, the shape of the cover segments is not limited to the cylindrical shape, and the cover segments may have any appropriate shape, for example, cube, rectangular prism, cuboid, cone, triangular prism, or pentagonal prism.

Referring to FIG. 4A, the first cover segment 114*a* has a first wall 121*a*, a first upper flange 122*a* coupled to or extending from a top of the first wall 121*a*, and a first lower flange 126*a* coupled to or extending from a bottom of the first wall 121*a*. Similarly, the second cover segment 114*b* has a second wall 121*b*, a second upper flange 122*b* coupled to or extending from a top of the second wall 121*b*, and a second lower flange 126*b* coupled to or extending from a bottom of the second wall 121*b*. Referring to FIGS. 3A and 3B, the third cover segment 114*c* has a third wall 121*c*, a third upper flange 122*c* coupled to or extending from a top of the third wall 121*c*, and a third lower flange 126*c* coupled to or extending from a bottom of the third wall 121*c*. Further, the fourth cover segment 114*d* has a fourth wall 121*d*, a fourth upper flange 122*d* coupled to or extending from a top of the fourth wall 121*d*, and a fourth lower flange 126*d* coupled to or extending from a bottom of the fourth wall 121*d*.

Further referring to FIG. 4A, the first upper flange 122*a* of the first cover segment 114*a* has a first internally protruded upper ridge 124*a* and a first externally protruded upper ridge 125*a*. The second upper flange 122*b* of the second cover segment 114*b* has a second internally protruded upper ridge 124*b* and a second externally protruded upper ridge 125*b*. Furthermore, according to some embodiments, the first lower flange 126*a* of the first cover segment 114*a* is a first internally protruded lower ridge 126*a*, and the second lower flange 126*b* of the second cover segment 114*b* is a second internally protruded lower ridge 126*b*. Moreover, referring to FIG. 3B, the third upper flange 122*c* of the third cover segment 114*c* includes a third internally protruded upper ridge 124*c* and a third externally protruded upper ridge 125*c*. Further, the fourth upper flange 122*d* of the fourth cover segment 114*d* includes a fourth internally protruded upper ridge 124*d* and a fourth externally protruded upper ridge 125*d*. According to some embodiment, the third lower flange 126*c* of the third cover segment 114*c* is a third internally protruded lower ridge 126*c*, and the fourth lower flange 126*d* of the fourth cover segment 114*d* is a fourth internally protruded lower ridge 126*d*.

Figure 4B:
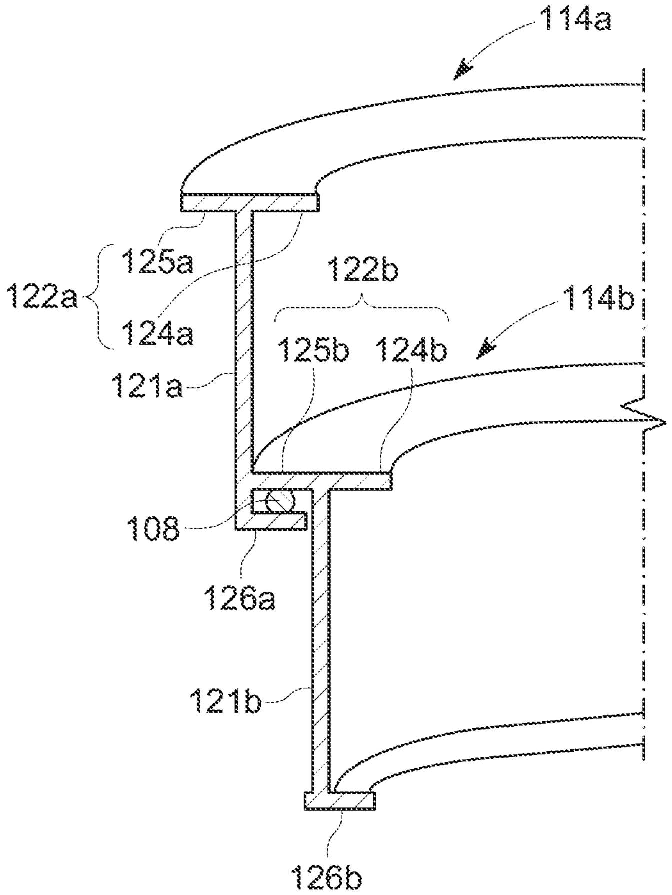
FIG. 4B is a schematic diagram of two cover segments of a cover assembly of a smart pole cabinet with a waterproof element positioned therebetween, according to certain aspects of the present disclosure.

As shown in FIG. 4A, the second externally protruded upper ridge 125*b* is movable between the first internally protruded upper ridge 124*a* and the first internally protruded lower ridge 126*a*. In some embodiments, surfaces of the first internally protruded lower ridge 126*a* and the second externally protruded upper ridge 125*b* are flat. The design of the cover assembly 104 protects the electrical components such as a telecommunication device stored in the base frame 101 from rain and/or dirt which may cause corrosion and rust. Referring to FIG. 4B, in some embodiments, the cover assembly 104 further includes a waterproof element 108 located on a surface of the first internally protruded lower ridge 126*a* or on a surface of the second externally protruded upper ridge 125*b*, such that the waterproof element 108 is positioned in between the first internally protruded lower ridge 126*a* of the first cover segment 114*a* and the second externally protruded upper ridge 125*b* of the second cover segment 114*b*. In some embodiments, a plurality of waterproof elements 108 are provided and each waterproof element 108 is positioned between two adjacent cover segments among the plurality of cover segments 114*a*, 114*b*, 114*c*, 114*d*. Further, each waterproof element 108 is in contact with the two adjacent cover segments when the cover assembly 104 is in the closed state, thus providing tighter sealing from the external factors such as rain and dust.

For example, the waterproof element 108 includes an O-ring, a gasket, or a glue material. Addition of the waterproof element 108 to the cover assembly 104 may be more effective in protecting the base frame 101 from harsh weather conditions.

Figure 5A:
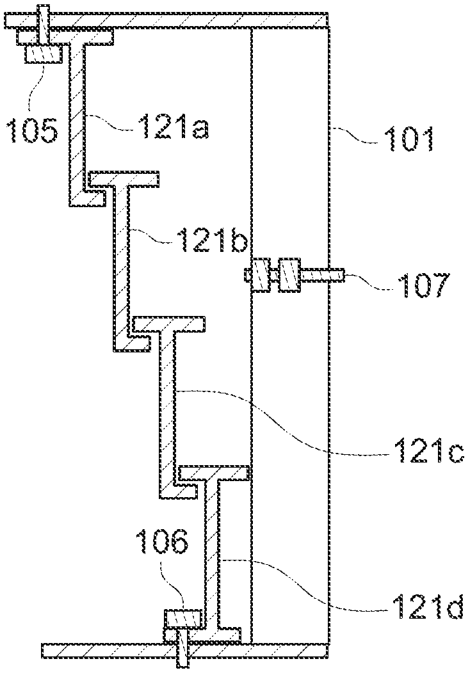
FIG. 5A is a schematic diagram of a portion of a smart pole assembly with its cover assembly in a closed state, according to certain aspects of the present disclosure.
Figure 5B:
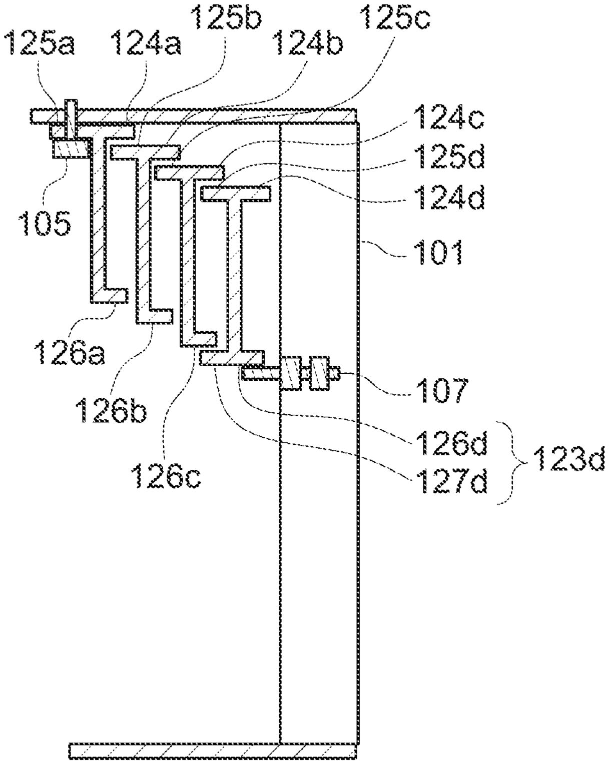
FIG. 5B is a schematic diagram of the portion of the smart pole assembly shown in FIG. 5A with its cover assembly in a first open state, according to certain aspects of the present disclosure.
Figure 5C:
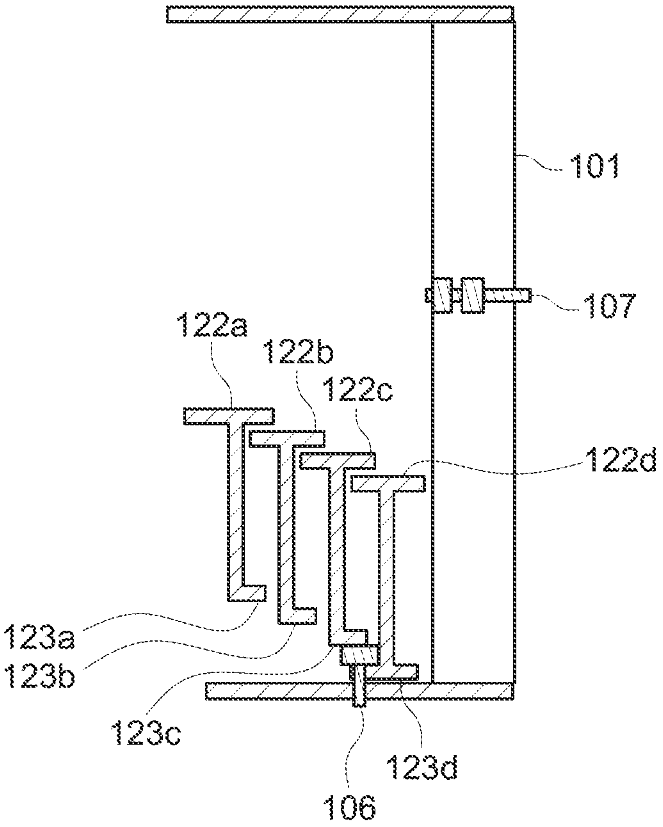
FIG. 5C is a schematic diagram of the portion of the smart pole assembly shown in FIG. 5A with its cover assembly in a second open state, according to certain aspects of the present disclosure.

Referring to FIGS. 2B, 2C, 5B, and 5C, the open state of the cover assembly 104 includes a first open state (FIGS. 2B and 5B) and a second open state (FIGS. 2C and 5C). Based on a different open state, the cover assembly 104 exposes a different portion of the hollow interior space within the base frame 101. For example, only a portion of the hollow interior space is exposed in the first open state, as shown in FIG. 2B, while a different portion of all of the hollow interior space is exposed in the second open state depending on the viewpoint, as shown in FIG. 2C. That is, the cover assembly 104 in the collapsed configuration can be positioned near the top portion of the base frame 101, as shown in FIG. 2B, or can be positioned near the bottom portion of the base frame 101, as shown in FIG. 2C. The first or second open state may be selected based on a position in the base frame 101 at which an electrical component is located, to allow easy access to the same.

Referring to FIGS. 5A and 5B, the smart pole assembly 100 further includes a top fastener 105 configured to secure the cover assembly 104 to the base frame 101. For example, the top fastener 105 penetrates a portion of the first cover segment 114*a* having a largest perimeter to secure the cover assembly 104 to the base frame 101. In some embodiments, the top fastener 105 penetrates a portion of the first externally protruded upper ridge 125*a* and is inserted into the top portion of the base frame 101, as exemplified in FIGS. 5A and 5B. It is noted that the top fastener 105 secures the cover assembly 104 to the base frame 101 when the cover assembly 104 is in the closed state (FIG. 5A) or in the first open state (FIG. 5B). It is further noted that the top fastener 105 is released from the cover assembly 104 and the base frame 101 to place the cover assembly 104 in the second open state, as shown in FIG. 5C. For example, the top fastener 105 includes a screw or pin.

Referring to FIGS. 5A and 5C, the smart pole assembly 100 further includes a bottom fastener 106 configured to secure the cover assembly 104 to the base frame 101. For example, the bottom fastener 106 penetrates a portion of the fourth cover segment 114*d* having a smallest perimeter to secure the cover assembly 104 to the base frame 101. For example, referring to FIG. 5B, the fourth upper flange 122*d* of the fourth cover segment 114*d* includes a fourth internally protruded upper ridge 124*d* and a fourth externally protruded upper ridge 125*d*. Further, the fourth lower flange 126*d* of the fourth cover segment 114*d* includes a fourth internally protruded lower ridge 126*d* and a fourth externally protruded lower ridge 127*d*. In some embodiments, the bottom fastener 106 penetrates a portion of the fourth externally protruded lower ridge 127*d* and is inserted into the bottom portion of the base frame 101, as exemplified in FIGS. 5A and 5C. It is noted that the fourth externally protruded lower ridge 127*d* is not shown in FIGS. 3A and 3B showing the fourth cover segment 114*d*. In some embodiments, the fourth cover segment 114*d* does not have the fourth externally protruded lower ridge 127*d* as shown in FIGS. 3A and 3B. In this case, the cover assembly 104 will remain closed, as exemplified in FIG. 3B, even without a need for a fastener for securing the cover assembly 104 to the bottom portion of the base frame 101 by its gravity. In this case, the cover assembly 104 may be opened without requiring releasing a fastener. That is, there is no locking mechanism for the cover assembly 104 exemplified in FIGS. 3A and 3B. In some embodiments, the lower flanges 126*a*, 126*b*, 126*c* of the first, second, and third cover segments 114*a*, 114*b*, 114*c* do not have an externally protruded lower ridge, as shown in FIGS. 5A-5C.

However, in some embodiments, a locking mechanism is provided to protect the smart pole assembly 100 from unauthorized access. For example, as exemplified in FIGS. 5A and 5B, the bottom fastener 106 secures the cover assembly 104 to the base frame 101 when the cover assembly 104 is in the closed state (FIG. 5A) or in the second open state (FIG. 5C). It is further noted that the bottom fastener 106 is released from the cover assembly 104 and the base frame 101 to place the cover assembly 104 in the first open state, as shown in FIG. 5B. For example, the bottom fastener 106 includes a screw or pin. Thus, depending on the first or second open state, one of the top fastener 105 and the bottom fastener 106 needs to be released or unlocked to open the cover assembly 104.

Referring to FIGS. 5A-5C, the smart pole assembly 100 further includes a side fastener 107 configured to secure the cover assembly 104 in the open state. In particular, the side fastener 107 needs to be engaged with the cover assembly 104 in the first open state to prevent the collapsed cover assembly 104 from being extended to be closed, as shown in FIG. 5B. For example, the side fastener 107 is a screw, pin, or latch that prevents the cover assembly 104 from being closed when engaged with the cover assembly 104. For example, the side fastener 107 is provided at a portion of the base frame 101 and is configured to be pushed in to be engaged with the cover assembly 104 or pulled out to be disengaged from the cover assembly 104.

According to certain aspects of the present disclosure, a method for opening the cover assembly 104 of the smart pole assembly 100 is disclosed. Referring to FIGS. 5A and 5C, the method includes releasing the top fastener 105 from the first cover segment 114*a* among the plurality of cover segments 114*a*, 114*b*, 114*c*, 114*d*, causing the cover assembly 104 to collapse in a first direction to be in the second open state. Referring to FIGS. 5A and 5C, the method further includes releasing the bottom fastener 106 from the fourth cover segment 114*d*, causing the cover assembly 104 to collapse in a second direction opposite the first direction to be in the first open state.

Referring to FIGS. 1B, 3A, and 3B, the perimeter of the first cover segment 114*a* is largest among perimeters of the plurality of cover segments 114*a*, 114*b*, 114*c*, 114*d*. Further, the perimeter of the fourth cover segment 114*d* is the smallest among the perimeters of the plurality of cover segments.

In some embodiments, the method further includes causing the side fastener 107 to contact a bottom surface of the fourth cover segment 114*d*, as shown in FIG. 5B. When the side fastener 107 is engaged with the fourth cover segment 114*d* after the cover assembly 104 is placed in the first open state, the cover assembly 104 can be maintained in the first open state, as shown in FIG. 5B.

While various embodiments of the present disclosure have been described above, it should be understood that they have been presented by way of example only, and not limitation. Numerous changes to the disclosed examples can be made in accordance with the disclosure herein without departing from the spirit or scope of the disclosure. Thus, the breadth and scope of the present disclosure should not be limited by any of the above described examples. Rather, the scope of the disclosure should be defined in accordance with the following claims and their equivalents.

One or more elements or aspects or steps, or any portion(s) thereof, from one or more of any of claims below can be combined with one or more elements or aspects or steps, or any portion(s) thereof, from one or more of any of the other claims or combinations thereof, to form one or more additional implementations and/or claims of the present disclosure.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this disclosure belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A smart pole assembly for a telecommunication network, the smart pole assembly comprising:

a base frame having a hollow interior space for receiving at least one telecommunication device;

a pole fixed to the base frame and having a pole top configured to facilitate transmitting or receiving of communications between the telecommunication device and another telecommunication device; and a collapsible cover assembly coupled to and enclosing the base frame, wherein the collapsible cover assembly is configured to switch between a closed state and an open state, the collapsible cover assembly fully enclosing the hollow interior space in the closed state for protecting the at least one telecommunication device, the collapsible cover assembly exposing and providing access to at least a portion of the hollow interior space in the open state, wherein the open state includes a first open state caused by collapsing of the collapsible cover assembly in a second direction to be in a first collapsed configuration and a second open state caused by collapsing of the collapsible cover assembly in a first direction opposite the second direction to be in a second collapsed configuration, and wherein the collapsible cover assembly exposes a first portion of the hollow interior space within the base frame in the first open state and exposes a second portion of the hollow interior space in the second open state.

2. The smart pole assembly of claim 1, wherein the collapsible cover assembly includes a plurality of cover segments, each of a subset of the cover segments being of progressively smaller perimeters nested within each other.

3. The smart pole assembly of claim 2, wherein each cover segment has a cylindrical shape.

4. The smart pole assembly of claim 2, wherein each cover segment has a wall, an upper flange coupled to or extending from a top of the wall, and a lower flange coupled to or extending from a bottom of the wall.

5. The smart pole assembly of claim 4, wherein the upper flange has an externally protruded upper ridge and an internally protruded upper ridge.

6. The smart pole assembly of claim 5, wherein the lower flange has an internally protruded lower ridge.

7. The smart pole assembly of claim 2, wherein the plurality of cover segments includes at least a first cover segment and a second cover segment, the second cover segment being slidably coupled to the first cover segment, a perimeter of the second cover segment being smaller than a perimeter of the first cover segment.

8. The smart pole assembly of claim 7, wherein:

the first cover segment has a first cover segment upper flange and a first cover segment lower flange, the first cover segment upper flange including a first cover segment externally protruded upper ridge and a first cover segment internally protruded upper ridge, and the first cover segment lower flange including a first cover segment internally protruded lower ridge; and the second cover segment has a second cover segment upper flange and a second cover segment lower flange, the second cover segment upper flange including a second cover segment externally protruded upper ridge and a second cover segment internally protruded upper ridge, and the second cover segment lower flange including a second cover segment internally protruded lower ridge, the second cover segment externally protruded upper ridge being movable between the first cover segment internally protruded upper ridge and the first cover segment internally protruded lower ridge.

9. The smart pole assembly of claim 7, wherein the plurality of cover segments further includes a third cover segment that is slidably coupled to the second cover segment, a perimeter of the third cover segment being smaller than the perimeter of the second cover segment.

10. The smart pole assembly of claim 8, wherein:

the collapsible cover assembly further includes a waterproof element located on a surface of the first cover segment internally protruded lower ridge or on a surface of the second cover segment externally protruded upper ridge, the waterproof element being positioned in between the first cover segment internally protruded lower ridge of the first cover segment and the second cover segment externally protruded upper ridge of the second cover segment; and the waterproof element includes an O-ring, a gasket, or a glue material.

11. The smart pole assembly of claim 1, wherein the first direction is a downward direction, and the second direction is an upward direction.

12. The smart pole assembly of claim 1, further comprising a top fastener configured to secure the collapsible cover assembly to the base frame.

13. The smart pole assembly of claim 1, wherein the cover assembly in the first collapsed configuration is positioned adjacent to a top portion of the base frame, and the cover assembly in the second collapsed configuration is positioned adjacent to a bottom portion of the base frame.

14. A smart pole assembly for a telecommunication network, the smart pole assembly comprising:

a base frame having a hollow interior space for receiving at least one telecommunication device;

a pole fixed to the base frame and having a pole top configured to facilitate transmitting or receiving of communications between the telecommunication device and another telecommunication device;

a cover assembly coupled to and enclosing the base frame, the cover assembly configured to switch between a closed state and an open state, the cover assembly fully enclosing the hollow interior space in the closed state for protecting the at least one telecommunication device, the cover assembly exposing and providing access to at least a portion of the hollow interior space in the open state; and a top fastener configured to secure the cover assembly to the base frame, wherein the cover assembly includes a plurality of cover segments, and the top fastener penetrates a portion of a cover segment having a largest perimeter to secure the cover assembly to the base frame.

15. The smart pole assembly of claim 14, further comprising a bottom fastener configured to secure the cover assembly to the base frame, wherein the bottom fastener penetrates a portion of a cover segment having a smallest perimeter to secure the cover assembly to the base frame.

16. The smart pole assembly of claim 15, further comprising a side fastener configured to secure the cover assembly in the open state, preventing the cover assembly from being closed.

17. A smart pole cabinet comprising a frame and a cover assembly coupled to and enclosing the frame, wherein:

the cover assembly includes at least a first cover segment having a largest diameter and a second cover segment having a smallest diameter;

the cover assembly is in a fully extended configuration when the cover assembly is in a closed state;

the cover assembly is in a collapsed configuration when the cover assembly is in an open state;

the first cover segment is at a top position and the second cover segment is at a bottom position when the cover assembly is in the closed state; and the first cover segment is at an outermost position and the second cover segment is at an innermost position when the cover assembly is in the open state, wherein the open state includes a first open state and a second open state, the cover assembly surrounding a first portion of an interior space of the frame in the first open state, the cover assembly surrounding a second portion of the interior space in the second open state.

18. The smart pole cabinet of claim 17, further comprising a plurality of waterproof elements, wherein each waterproof element is positioned between two adjacent cover segments among a plurality of cover segments, wherein each waterproof element is in contact with the two adjacent cover segments when the cover assembly is in the closed state, and wherein the waterproof elements comprise an O-ring, a gasket, or a glue material.

19. A method for opening a cover assembly of a smart pole assembly, wherein the cover assembly includes a plurality of cover segments, the method comprising:

releasing a top fastener from a first cover segment among the plurality of cover segments progressively coupled with each other, causing the cover assembly to collapse in a first direction to be in a second open state; and releasing a bottom fastener from a second cover segment among the plurality of cover segments, causing the cover assembly to collapse in a second direction opposite the first direction to be in a first open state, wherein a first perimeter of the first cover segment is largest among perimeters of the plurality of cover segments, and wherein a second perimeter of the second cover segment is smallest among the perimeters of the plurality of cover segments.

20. The method of claim 19, further comprising:

causing a side fastener to contact a bottom surface of the second cover segment to maintain the cover assembly in the first open state.

* * * * *